United States Patent
Lim

(10) Patent No.: US 9,668,287 B2
(45) Date of Patent: May 30, 2017

(54) METHOD OF CONNECTING WIRELESS COMMUNICATION DEVICES AND WIRELESS COMMUNICATION DEVICE USING THE SAME

(75) Inventor: Jin-mook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 12/698,748

(22) Filed: Feb. 2, 2010

(65) Prior Publication Data

US 2010/0232408 A1  Sep. 16, 2010

(30) Foreign Application Priority Data

Mar. 12, 2009  (KR) ........................ 10-2009-0021225

(51) Int. Cl.
*H04B 7/00* (2006.01)
*H04W 76/02* (2009.01)
*H04W 8/00* (2009.01)
*H04W 84/18* (2009.01)
*H04W 88/06* (2009.01)

(52) U.S. Cl.
CPC .......... *H04W 76/023* (2013.01); *H04W 8/005* (2013.01); *H04W 84/18* (2013.01); *H04W 88/06* (2013.01)

(58) Field of Classification Search
CPC ... H04W 76/023; H04W 84/18; H04W 88/06; H04W 8/005
USPC ........... 370/338; 455/432.1, 41.1, 41.2, 41.3, 455/552.1, 88, 90.2, 3.05, 30.6; 709/227
See application file for complete search history.

(56) References Cited

U.S. PATENT DOCUMENTS

| | | | | |
|---|---|---|---|---|
| 5,450,494 A * | 9/1995 | Okubo et al. | .................... | 381/57 |
| 6,172,549 B1 * | 1/2001 | Gilbert | .......................... | 327/349 |
| 6,437,630 B1 * | 8/2002 | Gilbert | .......................... | 327/348 |
| 9,070,149 B2 * | 6/2015 | Lin | ......................... | G06F 21/10 |
| 9,215,284 B2 * | 12/2015 | Choi | ........................ | H04L 67/16 |
| 2002/0078161 A1 * | 6/2002 | Cheng | ................. | H04L 12/2803 709/208 |
| 2006/0094360 A1 | 5/2006 | Jung et al. | | |
| 2006/0156388 A1 * | 7/2006 | Stirbu | ................. | H04L 63/0807 726/4 |
| 2006/0208066 A1 * | 9/2006 | Finn et al. | ..................... | 235/380 |
| 2007/0160004 A1 | 7/2007 | Sakhpara | | |
| 2007/0198144 A1 * | 8/2007 | Norris et al. | .................... | 701/23 |

(Continued)

FOREIGN PATENT DOCUMENTS

| | | |
|---|---|---|
| JP | 2006-524958 | 2/2006 |
| KR | 10-0643282 | 5/2006 |

(Continued)

*Primary Examiner* — Tan H Trinh
(74) *Attorney, Agent, or Firm* — NSIP Law

(57) ABSTRACT

A wireless communication device and method for same, including: a first communication unit configured to use a non-IP-based wireless communication protocol, a second communication unit configured to use an IP-based wireless communication protocol, and a controller configured to: search for a wireless device for communication, the wireless communication device configured to provide a universal plug and play (UPnP) service, the search being by use of the first communication unit, and initiate the UPnP service with respect to a found wireless device for communication by use of the second communication unit.

20 Claims, 5 Drawing Sheets

(56) References Cited

U.S. PATENT DOCUMENTS

| | | | |
|---|---|---|---|
| 2008/0058031 A1 | 3/2008 | Deprum | |
| 2008/0103608 A1* | 5/2008 | Gough et al. | 700/1 |
| 2008/0181337 A1* | 7/2008 | Maxim | 375/340 |
| 2009/0036126 A1* | 2/2009 | Morikuni et al. | 455/435.2 |
| 2009/0132737 A1* | 5/2009 | Huang et al. | 710/62 |
| 2011/0115818 A1* | 5/2011 | Chung | G06F 3/1423 345/635 |
| 2012/0020428 A1* | 1/2012 | Roth | G08C 17/02 375/295 |
| 2012/0083937 A1* | 4/2012 | Kong et al. | 700/295 |
| 2012/0129498 A1* | 5/2012 | Morikuni et al. | 455/411 |
| 2013/0047178 A1* | 2/2013 | Moon | H04N 21/4122 725/25 |
| 2016/0059133 A1* | 3/2016 | Firouzbakhsh | A63F 13/32 463/31 |

FOREIGN PATENT DOCUMENTS

| | | |
|---|---|---|
| KR | 10-2006-0628319 | 6/2006 |
| KR | 10-2006-0107659 | 10/2006 |
| KR | 10-2008-0020572 | 3/2008 |
| KR | 10-2008-0024057 | 3/2008 |
| WO | WO 2004/086667 A2 | 3/2004 |

\* cited by examiner

METHOD OF CONNECTING WIRELESS COMMUNICATION DEVICES AND WIRELESS COMMUNICATION DEVICE USING THE SAME

CROSS-REFERENCE TO RELATED APPLICATION

This application claims the benefit under 35 U.S.C. §119 (a) of Korean Patent Application No. 10-2009-0021225, filed on Mar. 12, 2009, the disclosure of which is incorporated herein by reference in its entirety for all purposes.

BACKGROUND

1. Field

The following description relates to a wireless communication technology.

2. Description of the Related Art

In recent times, a large number of mobile devices have been developed in light of the progress made in respect to information and communication technologies. Such mobile devices perform communication through a wireless communication protocol such as Wi-Fi.

Wi-Fi is a wireless communication protocol enabling access to internet and intranet by use of an adjacent access point. Wi-Fi is a technology of searching for an adjacent access point and enabling a wireless communication based on IP provided by a found access point. In general, Wi-Fi performs communication after receiving IP through an access point. However, without using such an access point, Wi-Fi is capable of performing communication with devices belonging to an ad-hoc network through an ad-hoc mode. Also, similar to Bluetooth and ZigBee, Wi-Fi is capable of supporting an ad-hoc mode that is used to configure an ad-hoc network without using an access point.

ZigBee is one of IEEE 802.15.4 standards and represents a wireless communication technology for a short range wireless networking having a transmission radius of about 30 meters. ZigBee does not use an internet protocol (IP) and provides low transmission speed but has low power consumption. The Wi-Fi achieves better signaling speed than ZigBee but has greater power consumption.

However, to maintain an ad-hoc mode of Wi-Fi in an activated state, a great amount of power is consumed. For this reason, Wi-Fi is not suitable for a small sized mobile device having a small battery capacity. However, in spite of such high power consumption, Wi-Fi achieves higher transmission speed when compared with other wireless communication protocol such as ZigBee or Bluetooth, and thus users are in need of an ad-hoc network based on Wi-Fi.

SUMMARY

Accordingly, in one aspect, there is provided a wireless communication technology for a mobile device, capable of providing a high speed ad-hoc network environment while reducing power consumption of the mobile device.

In one general aspect, there is provided a wireless communication device. The wireless communication device includes a first communication unit configured to use a non-IP-based wireless communication protocol, a second communication unit configured to use an IP-based wireless communication protocol, and a controller configured to: search for another wireless communication device, which is configured to provide a universal plug and play (UPnP) service, the search being by use of the first communication unit and to initiate the UPnP service with respect to the found wireless communication device by use of the second communication unit.

The controller may exchange IP information with the found wireless communication device, and the IP information may include an IP address and a subnet mask.

In response to the IP information's having been exchanged, the controller may be further configured to activate the second communication unit. In response to the UPnP service's having been terminated, the controller may be further configured to inactivate the second communication unit.

The IP information may be contained in a request message for a UPnP service initiation and a response message to the request message. The IP information may be exchanged by exchanging the UPnP service initiation message and the response message.

In another general aspect, there is provided a method of connecting wireless communication devices. The method is performed as follows. A wireless communication device, which provides a universal plug and play (UPnP) service is searched for by use of a non-IP-based wireless communication unit. A UPnP start request message including IP information of the wireless communication device is transmitted to a found wireless communication device. A response message, which responds to the UPnP start request message and includes IP information of the found wireless communication device, is received. An IP-based wireless communication unit is activated. The UPnP service is initiated by use of the activated IP-based wireless communication unit.

The IP-based wireless communication unit may be inactivated in response to the UPnP service's having been terminated. The searching for the wireless communication device providing the UPnP service may further include searching for a first wireless communication device capable of performing an non-IP-based wireless communication, and searching for a second wireless communication device providing a UPnP service among the first wireless communication device and a type of the UPnP service provided by the second wireless communication device.

In another general aspect, there is provided a method of connecting wireless communication devices. The method is performed as follows. A first wireless communication device transmits a message used to search for a wireless communication device capable of performing a universal plug and play (UPnP) service by use of a non-IP-based wireless communication unit to a second wireless communication device. The second wireless communication device informs the first wireless communication device whether the second wireless communication device is capable of providing the UPnP service and about a type of the UPnP service provided by the second wireless communication device by use of a non-IP-based wireless communication unit. The first wireless communication device transmits a UPnP service start request message to the second wireless communication device. The second wireless communication device activates an IP-based wireless communication unit and transmits a response message responding to the UPnP service start request message to the first wireless communication device. The first wireless communication device activates an IP-based wireless communication unit.

The first wireless communication device and the second wireless communication device may each initiate the UPnP service by use of the activated IP-based wireless communication unit.

The non-IP-based wireless communication protocol may be based on ZigBee, and the IP-based wireless communication protocol may be based on Wi-Fi.

Other features will become apparent to those skilled in the art from the following detailed description, the drawings, and the claims.

Figure 1:
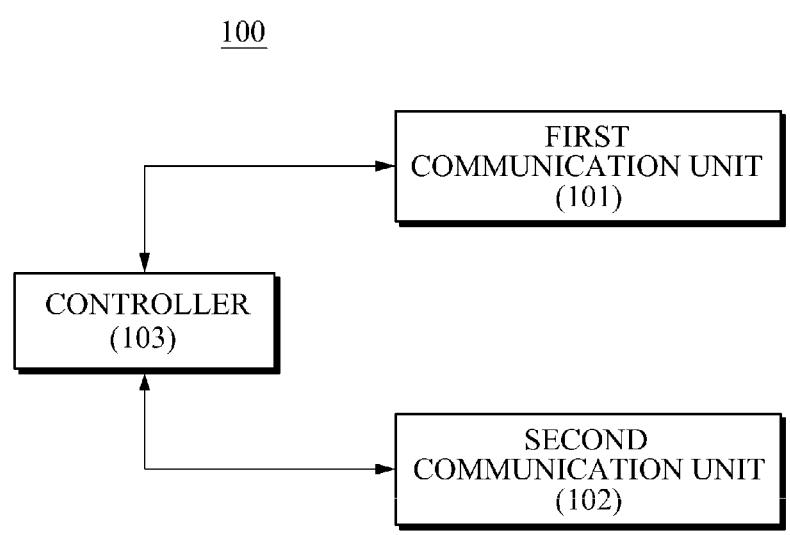
FIG. 1 is a block diagram of an example embodiment of a wireless communication device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Descriptions of well-known functions and structures may be omitted to enhance clarity and conciseness.

FIG. 1 illustrates an example embodiment of a wireless communication device. As shown in FIG. 1, a wireless communication device 100 may be embodied as a mobile terminal having a wireless communication module. For example, the wireless communication device 100 may be a mobile phone, an MP3 player, a laptop computer, a personal digital assistant (PDA), a portable multimedia player (PMP), a navigation system, a sensor or the like.

In addition, the wireless communication device 100 may configure a network in cooperation with another wireless communication device through the wireless communication module. In addition, the wireless communication device 100 may support a universal plug and play (UPnP) service.

The wireless communication module provided in the wireless communication device 100 includes a first communication unit 101, which does not operate based on internet protocol (IP) and a second communication unit 102 operating based on internet protocol (IP).

For example, the first communication unit 101 may use ZigBee as a wireless communication protocol, and the second communication unit 102 may use Wi-Fi as a wireless communication protocol.

The wireless communication device 100 further includes a controller 103 in addition to the first communication unit 101 and the second communication unit 102. The controller 103 may include software for a UPnP service and may control the first communication unit 101 and the second communication unit 102.

In addition, the controller 103 may search for an adjacent wireless communication device, which is capable of providing a UPnP service, by use of the first communication unit 101. For example, the controller 103 may exchange a message with the adjacent wireless communication device by use of ZigBee.

The messages exchangeable through the first communication unit 101 may include a message used to search for a wireless communication device, a message inquiring whether the wireless communication device is capable of providing a UPnP service, a message inquiring about the type of the UPnP service, and response messages responding to the above messages.

In addition, the controller 103 may be capable of exchanging IP information with a found adjacent wireless communication device. For example, the controller 103 may exchange an IP address and a subnet mask with an adjacent wireless communication device found by the first communication unit 101.

In addition, the controller 103 may initiate a UPnP service by use of the second communication unit 102 and IP information exchanged with the adjacent wireless communication device.

For example, the controller 103 may transmit a UPnP start request message to the found adjacent wireless communication device, wherein IP information of the wireless communication device 100 is included in the UPnP start request message. In a case where the controller 103 receives a UPnP start request message containing IP information of an adjacent wireless communication device, the controller 103 may send IP information set based on the received IP information.

In an example where IP information is exchanged between the wireless communication device 100 and the adjacent wireless communication device, IP-based wireless communication protocol may become available. That is, in response to the exchange of IP information, the controller 103 may activate the second communication unit 102 and may perform wireless communication through the second communication unit 102.

For example, in response to the second communication unit's 102 using Wi-Fi, the wireless communication device 100 may perform wireless communication through an ad-hoc mode without using an access point. That is, the controller 103 may initiate a UPnP service with respect to the adjacent wireless communication device by use of the second communication unit 102 and the exchanged IP information.

In addition, in response to the UPnP service's being terminated, the controller 103 may inactivate the second communication unit 102 to prevent unnecessary power consumption.

Figure 2:
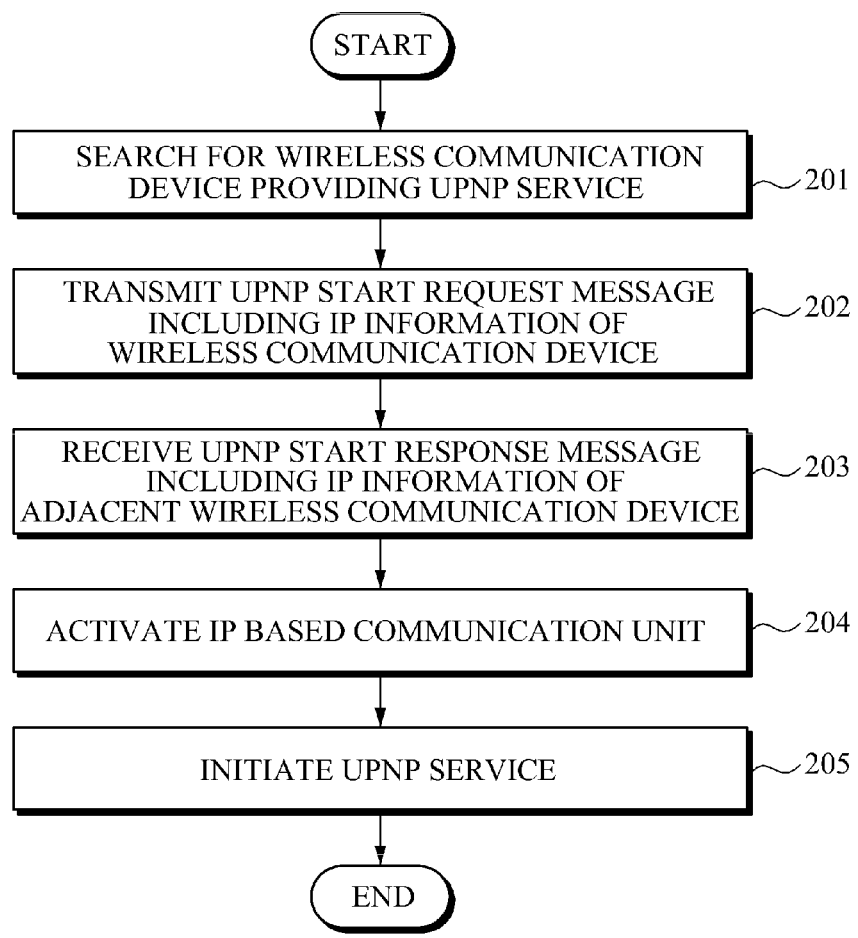
FIG. 2 is a flow chart of an operation of an example embodiment of a wireless communication device.

FIG. 2 depicts an operation of an example embodiment of a wireless communication device. As shown in FIG. 2, the controller 103 searches for an adjacent wireless communication device capable of providing a UPnP service by use of the first communication unit 101 (operation 201).

For example, the controller 103 may search for an adjacent wireless communication device using, e.g., ZigBee. After that, the controller 103 may search for a wireless communication device capable of providing a UPnP service among found wireless communication devices, and may find out the type of UPnP service provided by the wireless communication device.

A method of searching for an adjacent wireless communication device using, e.g., ZigBee, may be performed in such a manner that the controller 103 sends a ZigBee device discovery message and then receives a response message responding to the ZigBee device discovery message. In that case, an adjacent wireless communication device which has received the ZigBee device discovery message may provide the wireless communication device 100 with a response message containing device information and brief specification thereof.

In addition, a method of searching for a wireless communication device, which provides a UPnP service, among adjacent wireless communication devices using, e.g., ZigBee, and finding out the type of the UPnP service provided by the wireless communication device may be performed in such a manner that the controller 103 sends a predetermined discovery message for a UPnP device and a UPnP service and then receives a response message responding to the discovery message. In that case, the adjacent wireless communication device, which have received the discovery message, may send a response message informing about the availability of a UPnP service and the type of UPnP services provided by the adjacent wireless communication device.

For example, if an adjacent wireless communication device capable of providing a UPnP service is found, the controller 103 may send a UPnP start request message containing IP information of the wireless communication device 100 to the found wireless communication device (operation 202). The IP information may include an IP address and a subnet mask, and the IP address and the subnet mask may be arbitrarily designated.

The controller 103 may receive a response message responding to the UPnP start request message (operation 203). The response message may contain IP information of the wireless communication device found in operation 201.

In response, the controller 103 may activate the second communication unit 102 (operation 204). If the second communication unit 102 is activated, an internet protocol (IP), e.g., Wi-Fi, becomes available, and thus the controller 103 may enable communication through an ad-hoc mode without having to use an access point based on the IP information, which has been exchanged in the above process.

The controller 103 may initiate a UPnP service with respect to the found wireless communication device by use of the activated second communication unit 102 (operation 205).

If the UPnP service is initiated, the wireless communication device 100 and the adjacent wireless communication device may be connected to the same network, so that the wireless communication device 100 may exchange various kinds of data with the adjacent wireless communication device. In response the UPnP service's being terminated, the controller 103 may inactivate the second communication unit 102 to prevent unnecessary power consumption.

Figure 3:
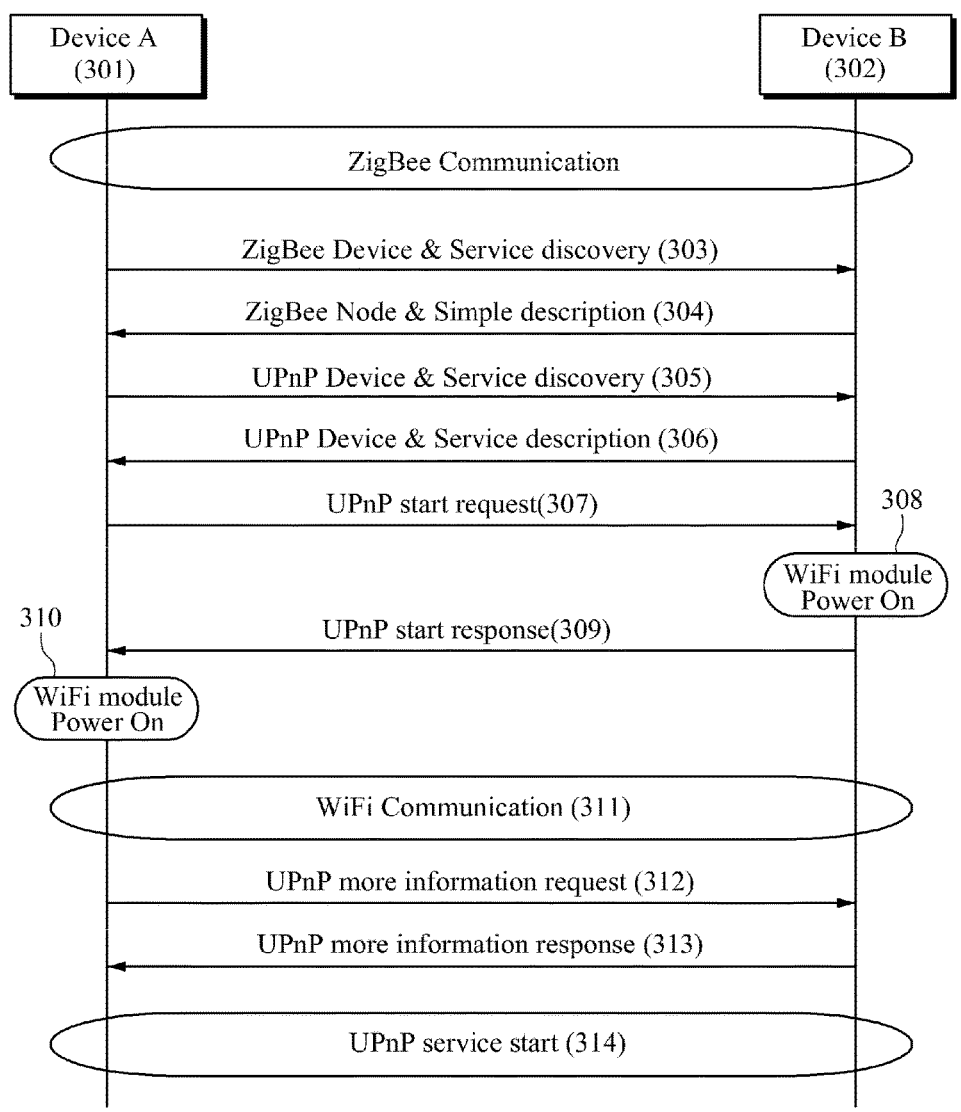
FIG. 3 is a conceptual diagram of an example embodiment of a method of connecting wireless communication devices.

FIG. 3 illustrates an example embodiment of a method of connecting wireless communication devices, in which the wireless communication devices are connected to the same network through a UPnP service. As shown in FIG. 3, the example embodiment of a wireless communication devices may exchange IP information with each other based on, e.g., ZigBee, corresponding to a non-IP-based protocol, and activate, e.g., Wi-Fi, corresponding to an IP-based protocol, so that the wireless communication devices are connected to each other through a UPnP network.

A device A 301 transmits a device discovery message to a device B 302 through a wireless communication protocol, e.g., ZigBee (operation 303). The device discovery message may include a message used to search for a wireless communication device capable of performing non-IP, e.g., ZigBee, communication.

The device B 302 may receive the device discovery message and may transmit a response message responding to the device discovery message to the device A 301 (operation 304). The response message may contain device information and brief description of the device B 302. The device A 301 which has received the response message is informed that the device B 302 is capable of performing non-IP, e.g., ZigBee, communication.

The device A 301 may transmit a UPnP service discovery message to the device B 302 (operation 305). The UPnP service discovery message may include a message inquiring whether the device B 302 is capable of providing a UPnP service and a message inquiring of a type of the UPnP service.

In response to the UPnP service discovery message, the device B 302 may transmit a response message, which informs the device A 301 whether the device B 302 is capable of providing a UPnP service and informs the device A 301 of the type of UPnP service provided by the device B 302 (operation 306).

In this manner, the device A 302 may be informed which communication device is capable of providing a UPnP service and may be informed about the type of UPnP service provided by the communication device.

The device A 301 may determine a desired UPnP service and may transmit a UPnP start request message to the device B 302 (operation 307). The UPnP start request message may contain IP information of the device A 301. In addition, the IP information may include an IP address and a subnet mask of the device A 301.

The device B 302, which has received the UPnP start request message, may activate an IP, e.g., Wi-Fi-wireless communication protocol, of the device B 302 (operation 308).

The device B 302 may transmit a response message in response to the UPnP start request message to the device A 301 (operation 309). The response message may contain IP information of the device B 302, and the IP information of the device B 302 is set based on the IP information received from the device A 301 such that the device B 302 belongs to the same network as the device A 301. In addition, the IP information of the device B 302 may include an IP address and a subnet mask of the device B 302.

The device A 301 which has received the response message from the device B 302 may activate an IP, e.g., Wi-Fi-wireless communication protocol, of the device A 301 (operation 310).

In this manner, the device A 301 and the device B 302 may exchange IP information with each other and complete a preparation for initiating wireless communication by use of the IP, e.g., Wi-Fi-wireless communication protocols. For example, when the IP information exchanged between the device A 301 and the device B 302 include the IP address and the subnet mask, the device A 301 and the device B 302 may belong to the same network.

The device A 301 may request the device B 302 to provide detailed information to initiate a UPnP service (operation 312), and the device B 302 may provide the requested detailed information to the device A 301 (operation 313).

The device A 301 and the device B 302 may initiate the UPnP service (operation 314).

In response to the UPnP service's being terminated, the device A 301 and the device B 302 may inactivate their own respective IP, e.g., Wi-Fi wireless communication protocols, so as to reduce unnecessary power consumption.

Figure 4:
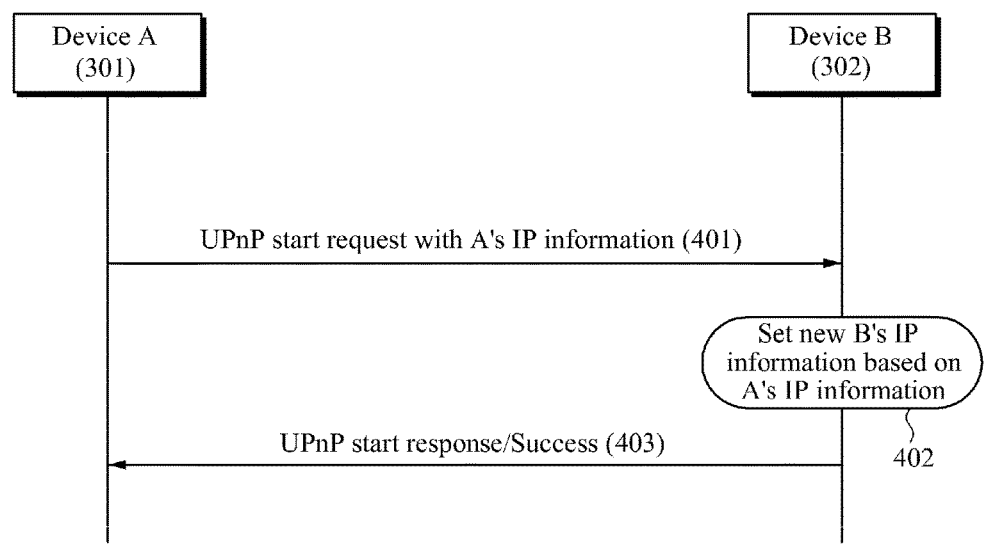
FIG. 4 is a conceptual diagram of an example embodiment of a method of exchanging IP information.

FIG. 4 depicts an example embodiment of a method of exchanging IP information in a case where no IP information is assigned to the device A and the device B. IP information may be referred to as not being assigned to the device A 301 and the device B 302, when the device A 301 and the device B 302 may not belong to any ad-hoc network. As shown in FIG. 4, the device A 301 may generate IP information thereof, and may send the IP information in a UPnP start request message to the device B 302 (operation 401).

The device B 302 may set IP information thereof based on the received IP information of the device A 301 (operation 402). The IP information may include an IP address and a subnet mask.

After that, the device B 302 may send the IP information thereof in a response message responding to the UPnP start request message to the device A 301 (operation 403).

Figure 5:
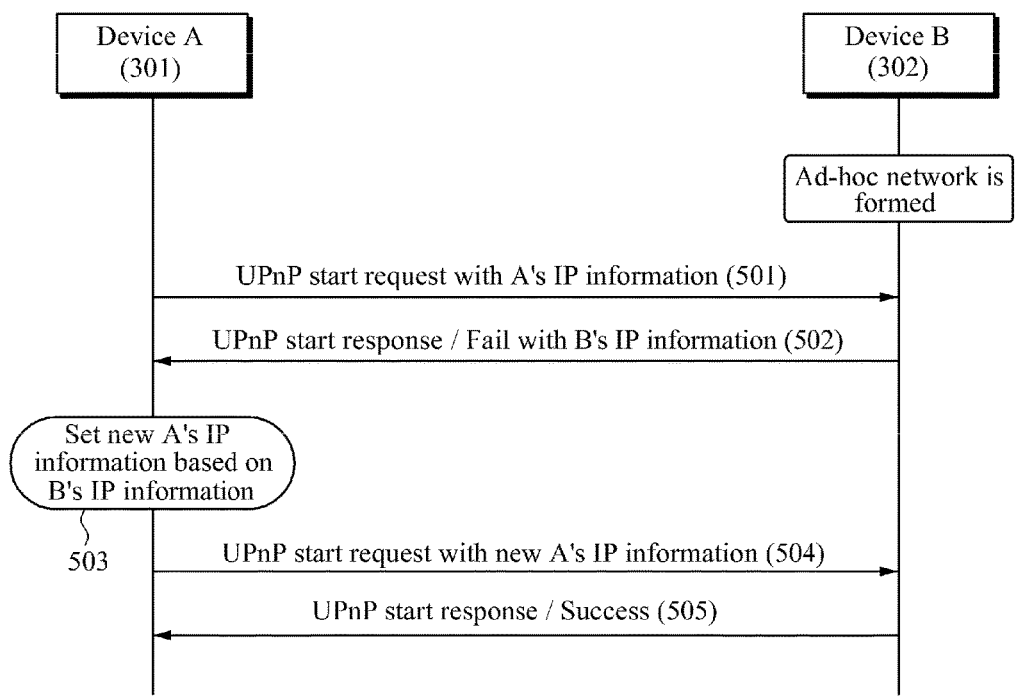
FIG. 5 is a conceptual diagram of another example embodiment of a method of exchanging IP information.

FIG. 5 illustrates another example of a method of exchanging IP information in a case where the device A 301 is not assigned IP information and the device B 302 is assigned IP information. As shown in FIG. 5, the device A 301 may generate IP information thereof, and may send the IP information in a UPnP start request message to the device B 302 (operation 501).

Since the device B 302 has been assigned IP information, the device B 302 may transmit a fail message to the device A 301 in response to the UPnP start request message (operation 502). The fail message may contain the IP information which has been assigned to the device B 302.

The device A 301 may receive the fail message and modifies the IP information of the device A 301, which has been generated in operation 501, based on the IP information of the device B 302 contained in the fail message. For example, the device A 301 may modify the IP information thereof based on the IP information of the device B 302 such that the device A and the device B belong to the same network.

After that, the device A 301 again sends the modified IP information in the UPnP start request message to the device B 302 (operation 504).

Finally, the device B 302 may transmit a success message to the device A 301 (operation 505).

As described above, the IP, e.g., Wi-Fi, ad-hoc mode may be activated only if finding a wireless communication device capable of performing a UPnP service, so that unnecessary power consumption can be reduced and high speed data communication can be ensured.

Although the above description included an IP example of Wi-Fi and a non-IP example of ZigBee, it should be appreciated that these examples are nonlimiting, and other IP and non-IP communication types may be used by one skilled in the art. Other nonlimiting examples of communication protocols include Z-Wave, Wibree, ONE-NET, 6LoWPAN, neuRFon, DASH7, EDGE, GPRS, WiMAX, RTT, CDMA, CDMA2000, EV-DO, and UMTS. Any trademarks used herein are the property of their respective owners.

Disclosed are a wireless communication device and a method of connecting wireless communication devices. A wireless communication device providing a UPnP service is searched for by use of a non-IP-based wireless communication technology. IP information is exchanged between the wireless communication device and the found wireless communication device. The UPnP service is initiated by use of IP-based wireless communication technology. The wireless communication device selectively activates an ad-hoc mode in spite of the absence of an access point, thereby ensuring a high speed communication with low power consumption.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless communication device, comprising:
   a first communication unit configured to use a non-IP-based wireless communication protocol;
   a second communication unit configured to use an IP-based wireless communication protocol; and
   a controller configured to:
   search, using the first communication unit, for another wireless device, the wireless communication device configured to provide a universal plug and play (UPnP) service;
   exchange IP information with the another wireless device by use of the first communication unit;
   activate the second communication unit from an inactive state, in response to the exchange of the IP information;
   initiate the UPnP service with the another wireless device by use of the second communication unit; and
   inactivate the second communication unit, in response to termination of the UPnP service.

2. The wireless communication device of claim 1, wherein the non-IP-based wireless communication protocol is based on ZigBee.

3. The wireless communication device of claim 1, wherein the IP-based wireless communication protocol is based on Wi-Fi.

4. The wireless communication device of claim 1, wherein the IP information comprises an IP address and a subnet mask.

5. The wireless communication device of claim 1, wherein the controller is further configured to transmit a UPnP start request message to the another wireless device.

6. The wireless communication device of claim 1, wherein the controller is further configured to:
receive a UPnP start request message from the another wireless device;
generate IP information of the wireless communication device; and
send the generated IP information, in a response message to the UPnP start request message.

7. The wireless communication device of claim 1, wherein the exchanging IP information with the another wireless device comprises generating IP information of the another device and sending the IP information of the another device in a UPnP start request to the another device.

8. The wireless communication device of claim 7, wherein the controller is further configured to receive a fail message from the another device, in response to the another device having prior IP information assigned prior to the sending of the IP information of the another device in the UPnP start request to the another device.

9. The wireless communication device of claim 8, wherein the controller is further configured to modify IP information of the wireless communication device, in response to receiving the fail message from the another device.

10. The wireless communication device of claim 9, wherein the modifying the IP information of the wireless communication device comprises modifying the IP information of the wireless communication device based on the IP information of the another device so that the wireless communication device and the another device belong to the same network.

11. A method of connecting a wireless communication device with another wireless communication device, the method comprising:
searching for the another wireless communication device by use of a non-IP-based wireless communication unit, the another wireless communication device being configured to provide a universal plug and play (UPnP) service;
transmitting a UPnP start request message including IP information of the wireless communication device to the another wireless communication device by use of the non-IP-based wireless communication unit;
receiving a response message to the UPnP start request message, the response message including IP information of the another wireless communication device by use of the non-IP-based wireless communication unit;
activating an inactive IP-based wireless communication unit;
initiating the UPnP service with respect to the another wireless communication device by use of the activated IP-based wireless communication unit; and
inactivating the IP-based wireless communication unit, in response to termination of the UPnP service.

12. The method of claim 11, wherein the non-IP-based wireless communication unit is based on ZigBee.

13. The method of claim 11, wherein the IP-based wireless communication unit is based on Wi-Fi.

14. The method of claim 11, wherein the searching for the another wireless communication device providing the UPnP service comprises:
searching for one or more first wireless communication devices capable of performing non-IP-based wireless communication; and
searching for a second wireless communication device providing a UPnP service among the one or more first wireless communication devices and a type of the UPnP service provided by the second wireless communication device.

15. A method of connecting wireless communication devices, the method comprising:
at a first wireless communication device, transmitting a message used to search for a wireless communication device capable of performing a universal plug and play (UPnP) service by use of a non-IP-based wireless communication unit, to a second wireless communication device;
at the second wireless communication device, informing the first wireless communication device whether the second wireless communication device is capable of providing the UPnP service and of a type of the UPnP service provided by the second wireless communication device by use of a non-IP-based wireless communication unit;
at the first wireless communication device, transmitting a UPnP service start request message comprising IP information of the first wireless communication device to the second wireless communication device by use of the non-IP-based wireless communication unit;
at the second wireless communication device, transmitting a response message, responding to the UPnP service start request message, to the first wireless communication device by use of the non-IP-based wireless communication unit and activating an IP-based wireless communication unit;
at the first wireless communication device, activating an inactive IP-based wireless communication unit; and
at the first wireless communication device and the second wireless communication device, inactivating the IP-based wireless communication unit, in response to the UPnP service being terminated,
wherein the response message responding to the UPnP service start request message comprises IP information of the second wireless communication.

16. The method of claim 15, wherein the non-IP-based wireless communication unit is based on ZigBee.

17. The method of claim 15, wherein the IP-based wireless communication unit is based on Wi-Fi.

18. The method of claim 15, further comprising at the first wireless communication device and the second wireless communication device, initiating the UPnP service by use of the activated IP-based wireless communication unit.

19. A wireless communication method executed by a wireless communication apparatus, the method comprising:
determining, through communication with another wireless communication apparatus using a non-internet-protocol (non-IP) based wireless communication protocol, whether the other wireless communication apparatus is capable of supporting universal plug and play (UPnP) service;
exchanging IP information with the other wireless communication apparatus by use of the non-IP-based wireless communication protocol, in response to the other wireless communication apparatus being capable of supporting UPnP service;
activating an inactive IP-based wireless communication unit of the wireless communication apparatus; and communicating UPnP service wirelessly with the other communication device using an IP-based wireless communication protocol, in response to the determination being affirmative.

20. A wireless communication apparatus, comprising:
a first communication component configured to determine, through communication with another wireless communication apparatus using a non-internet-protocol (non-IP) based wireless communication protocol, whether the other wireless communication apparatus is capable of supporting universal plug and play (UPnP) service, and exchange IP information with the other wireless communication apparatus by use of the non-IP-based wireless communication protocol, in response to the other wireless communication apparatus being capable of supporting UPnP service; and
a second inactive communication component configured to be activated, in response to the exchange of IP information, and to communicate UPnP service wirelessly with the other communication device using an IP-based wireless communication protocol, in response to the determination being affirmative.

\* \* \* \* \*